United States Patent
Kim et al.

(10) Patent No.: US 10,301,513 B2
(45) Date of Patent: May 28, 2019

(54) FLAME RETARDANT ADHESIVE AGENT COMPOSITION HAVING IMPROVED GAS BUBBLE STABILITY, AND METHOD FOR PREPARING SAME

(71) Applicant: LG Chem, Ltd., Seoul (KR)

(72) Inventors: Ji Hye Kim, Bucheon-si (KR); Jang Soon Kim, Seongnam-si (KR); Ae Jung Jang, Anyang-si (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/413,892

(22) PCT Filed: Jul. 10, 2013

(86) PCT No.: PCT/KR2013/006126
§ 371 (c)(1),
(2) Date: Jan. 9, 2015

(87) PCT Pub. No.: WO2014/010932
PCT Pub. Date: Jan. 16, 2014

(65) Prior Publication Data
US 2015/0210903 A1    Jul. 30, 2015

(30) Foreign Application Priority Data
Jul. 10, 2012  (KR) .......... 10-2012-0074864

(51) Int. Cl.
*C09J 133/08* (2006.01)
*C09J 133/02* (2006.01)
(Continued)

(52) U.S. Cl.
CPC ............ *C09J 133/08* (2013.01); *C08K 3/36* (2013.01); *C09J 133/02* (2013.01);
(Continued)

(58) Field of Classification Search
CPC ............ C08K 7/28; C08K 3/10–14; C08K 2003/2203–2296; C09J 133/08–12
See application file for complete search history.

(56) References Cited

U.S. PATENT DOCUMENTS

2005/0276963 A1* 12/2005 Kim .............. C09J 7/0217
                                                428/304.4
2011/0003135 A1*  1/2011 Hirao ............ C09J 4/00
                                                428/313.3
(Continued)

FOREIGN PATENT DOCUMENTS

CN   102190970 A   9/2011
EP   2374854 A1   10/2011
(Continued)

OTHER PUBLICATIONS

"DME series Electronic Density Meter" by Vibra Canada. http://twww.vibracanada.com/products/special/dmefIndex.html. Accessed Mar. 30, 2016.*
(Continued)

*Primary Examiner* — Michael M Dollinger
*Assistant Examiner* — Christina H.W. Rosebach
(74) *Attorney, Agent, or Firm* — Lerner, David, Littenberg, Krumholz & Mentlik, LLP

(57) ABSTRACT

Provided is an adhesive agent composition comprising: a copolymer in which a polar functional group-containing monomer is polymerized by the content ratio of 10 weight parts to 50 weight parts with respect to 100 weight parts of a (meth)acrylic acid ester-based monomer; thermally conductive inorganic fillers; and a hollow glass filler or gas bubbles. Also provided is a method for preparing the adhesive agent composition, comprising the steps of: preparing a copolymer by polymerizing a polar functional group-containing monomer by the content ratio of 10 weight parts to 50 weight parts with respect to 100 weight parts of a
(Continued)

(meth)acrylic acid ester-based monomer; adding thermally conductive inorganic fillers, a surface-active agent, a photoinitiator, and a photocuring agent to the copolymer to prepare a mixture; and adding a hollow glass filler or injecting gas bubbles into the mixture.

8 Claims, 1 Drawing Sheet

(51) Int. Cl.
*C09J 133/06* (2006.01)
*C08K 3/36* (2006.01)
C09J 4/00 (2006.01)
C08K 7/28 (2006.01)
C08K 3/22 (2006.01)

(52) U.S. Cl.
CPC ............. *C09J 133/066* (2013.01); *C08K 7/28* (2013.01); *C08K 2003/2227* (2013.01); *C09J 4/00* (2013.01)

(56) References Cited

U.S. PATENT DOCUMENTS

| | | | | |
|---|---|---|---|---|
| 2011/0122343 A1* | 5/2011 | Park | ...................... | C08F 220/18 349/96 |
| 2011/0129661 A1* | 6/2011 | Tsubaki | ................... | C09J 11/04 428/325 |
| 2011/0223380 A1* | 9/2011 | Ogawa | ................... | C09J 7/0217 428/131 |
| 2014/0308457 A1* | 10/2014 | Kim | .......................... | C09J 7/10 427/517 |

FOREIGN PATENT DOCUMENTS

| | | | | |
|---|---|---|---|---|
| EP | 2639259 | A1 | 9/2013 | |
| JP | 2006022189 | A | 1/2006 | |
| JP | 4086322 | B2 | 2/2008 | |
| JP | 2011190290 | A | 9/2011 | |
| KR | 20080057663 | A | 6/2008 | |
| KR | 20090043633 | A | 5/2009 | |
| WO | 2009058630 | A2 | 5/2009 | |
| WO | 2009070504 | A2 | 6/2009 | |
| WO | WO-2013085295 | A1 * | 6/2013 | ............ C09J 133/08 |

OTHER PUBLICATIONS

"Poly(2-ethylhexyl acrylate) solution" by Sigma Aldrich. http://www.sigmaaldrich.com/catalog/product/aldrich/182060?lang=en&region=US. Accessed May 24, 2016.*

International Search Report for PCT/KR2013/006126 dated Sep. 27, 2013, citing the above reference(s).

European Search Report dated Jun. 10, 2015 in connection with the counterpart European Patent Application No. 13816279.7, citing the above reference(s).

* cited by examiner

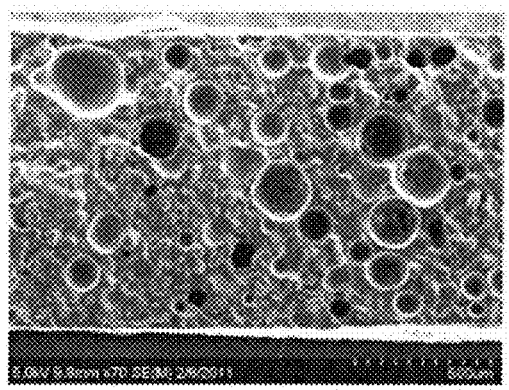
<Example 1>
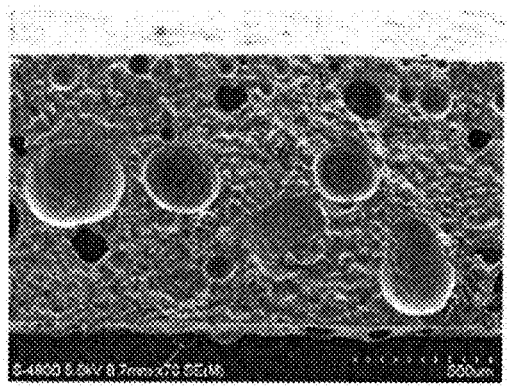
<Comparative Example 1>

FLAME RETARDANT ADHESIVE AGENT COMPOSITION HAVING IMPROVED GAS BUBBLE STABILITY, AND METHOD FOR PREPARING SAME

TECHNICAL FIELD

The present invention relates to a flame retardant adhesive composition exhibiting improved bubble stability and a method for preparing the same.

BACKGROUND ART

Typically, when an adhesive composition contains bubbles, a method for increasing viscosity is widely used to secure bubble stability. However, even though viscosity is adjusted, if the adhesive composition includes a small amount of acrylic acid, the adhesive composition exhibits high bubble stability in winter in which air temperature is low, whereas the adhesive composition exhibits deteriorated bubble stability in summer in which air temperature is high. Thus, it is difficult to produce an acrylic foam tape including a bubble-dispersed adhesive composition which is not affected by external temperature.

Japanese Patent Laid-open Publication No. 2011-190290 discloses an adhesive composition including bubbles of carbon dioxide, inert gas such as argon, and the like. However, this publication is aimed at facilitating winding of an adhesive tape including the adhesive composition while suppressing protrusion of the adhesive composition, and does not disclose subject matter relating to stability of bubbles included in the adhesive composition, and the like.

DISCLOSURE

Technical Problem

It is an aspect of the present invention to provide a flame retardant adhesive composition exhibiting excellent bubble stability regardless of external temperature or viscosity thereof.

It is another aspect of the present invention to provide a method for preparing the adhesive composition as set forth above.

Technical Solution

In accordance with one aspect of the present invention, an adhesive composition includes: a copolymer in which 10 parts by weight to 50 parts by weight of a polar functional group-containing monomer is polymerized based on 100 parts by weight of a (meth)acrylic acid ester monomer; thermally conductive inorganic fillers; and hollow glass fillers or bubbles.

The (meth)acrylic acid ester monomer may include at least one selected from the group consisting of methyl (meth)acrylate, ethyl (meth)acrylate, n-propyl(meth)acrylate, isopropyl(meth)acrylate, n-butyl (meth)acrylate, t-butyl (meth)acrylate, sec-butyl (meth)acrylate, pentyl(meth)acrylate, 2-ethylhexyl(meth)acrylate, 2-ethylbutyl (meth)acrylate, n-octyl(meth)acrylate, isooctyl(meth)acrylate, isononyl (meth)acrylate, lauryl(meth)acrylate, tetradecyl(meth) acrylate, and combinations thereof.

The polar functional group-containing monomer may include at least one selected from the group consisting of hydroxyl group-containing monomers, carboxyl group-containing monomers, nitrogen-containing monomers, and combinations thereof.

The thermally conductive inorganic fillers may be present in an amount of about 50 parts by weight to about 300 parts by weight based on 100 parts by weight of the (meth)acrylic acid ester monomer.

The thermally conductive inorganic fillers may have an average particle diameter from about 1 μm to about 200 μm.

The thermally conductive inorganic fillers may include at least one selected from the group consisting of metal oxide, metal hydroxide, metal nitride, metal carbide, metal boride, and combinations thereof.

The hollow glass fillers or the bubbles may have a spherical shape.

The hollow glass fillers or the bubbles may have a diameter of about 20 μm to about 300 μm.

The hollow glass fillers may be present in an amount of about 0.1 parts by weight to about 20 parts by weight based on 100 parts by weight of the (meth)acrylic acid ester monomer.

The bubbles may be present in an amount of about 0.1% by volume (vol %) to about 10 vol %.

The adhesive composition may have a density of about 0.6 $g/cm^3$ to about 1.5 $g/cm^3$.

In accordance with another aspect of the present invention, a method for preparing an adhesive composition includes: preparing a copolymer by polymerizing about 10 parts by weight to about 50 parts by weight of a polar functional group-containing monomer based on 100 parts by weight of a (meth)acrylic acid ester monomer; preparing a mixture by adding thermally conductive inorganic fillers, a surfactant, a photoinitiator and a photocuring agent to the copolymer; and adding hollow glass fillers to the mixture or injecting bubbles into the mixture.

The method for preparing an adhesive composition may further include curing the mixture including the hollow glass fillers or the bubbles therein.

Advantageous Effects

The adhesive composition prevents the hollow glass fillers or the bubbles in the copolymer from floating to a surface of the adhesive composition and then bursting, and exhibits improved bubble stability.

In addition, the adhesive composition can secure flame retardancy, and can be coated onto one surface or both surfaces of acrylic foam and thus allow the adhesive composition-coated foam to be used as a foam tape.

DESCRIPTION OF DRAWINGS

FIG. 1 shows SEM images of specimens of Example 1 and Comparative Example 1, respectively.

BEST MODE

Hereinafter, embodiments of the present invention will be described in detail. It should be understood that the following embodiments are provided for illustrative purposes only and are not to be construed in any way as limiting the present invention. The scope and sprit of the present invention should be defined only by the accompanying claims and equivalents thereof.

In the drawings, portions irrelevant to the description are omitted for clarity. Like components will be denoted by like reference numerals throughout the specification.

Hereinafter, embodiments of the present invention will be described in detail.

Adhesive Composition

In accordance with one aspect of the present invention, an adhesive composition includes: a copolymer in which 10 parts by weight to 50 parts by weight of a polar functional group-containing monomer is polymerized based on 100 parts by weight of a (meth)acrylic acid ester monomer; thermally conductive inorganic fillers; and hollow glass fillers or bubbles.

The (meth)acrylic acid ester monomer may be any (meth) acrylic acid ester monomer without limitation. For example, the (meth)acrylic acid ester monomer may be an alkyl(meth) acrylate. Here, if an alkyl group included in the monomer has an excessively long chain, the adhesive composition can suffer from deterioration of cohesion and has difficulty in adjustment of glass transition temperature (Tg) and adhesion thereof. Thus, the (meth)acrylic acid ester monomer may be a $C_1$ to $C_{14}$ alkyl group-containing (meth)acrylic acid ester monomer.

Specifically, the (meth)acrylic acid ester monomer may include at least one selected from the group consisting of methyl (meth)acrylate, ethyl (meth)acrylate, n-propyl(meth) acrylate, isopropyl(meth)acrylate, n-butyl (meth)acrylate, t-butyl (meth)acrylate, sec-butyl (meth)acrylate, pentyl (meth)acrylate, 2-ethylhexyl(meth)acrylate, 2-ethylbutyl (meth)acrylate, n-octyl(meth)acrylate, isooctyl(meth)acrylate, isononyl(meth)acrylate, lauryl(meth)acrylate, tetradecyl(meth)acrylate, and combinations thereof.

In formation of the adhesive composition, the adhesive composition may include the polar functional group. In this case, the adhesive composition may be a copolymer of a monomer mixture of the (meth)acrylic acid ester monomer and the polar functional group-containing monomer.

The polar functional group-containing monomer includes the polar functional group copolymerizable with the (meth) acrylic acid ester monomer, and serves to adjust durability and cohesion of the adhesive composition. Examples of the polar functional group-containing monomer may include hydroxyl group-containing monomers, carboxyl group-containing monomers, and nitrogen-containing monomers.

Among the monomers as set forth above, the polar functional group-containing monomer may be a hydroxyl group-containing monomer, without being limited thereto. Examples of the hydroxyl group-containing monomers may include 2-hydroxyethyl (meth)acrylate, 2-hydroxypropyl (meth)acrylate, 4-hydroxybutyl (meth)acrylate, 6-hydroxyhexyl(meth)acrylate, 8-hydroxyoctyl(meth)acrylate, 2-hydroxyethylene glycol(meth)acrylate, and 2-hydroxypropylene glycol(meth)acrylate; examples of the carboxyl group-containing monomers may include (meth) acrylic acid, 2-(meth)acryloyloxy acetic acid, 3-(meth)acryloyloxy propylic acid, 4-(meth)acryloyloxy butyric acid, acrylic acid dimer, itaconic acid, maleic acid, and maleic anhydride; and examples of the nitrogen-containing monomers may include (meth)acrylamide, N-vinylpyrrolidone, and N-vinyl caprolactam, without being limited thereto.

The adhesive composition includes the thermally conductive inorganic fillers. Here, the thermally conductive inorganic fillers affect flame retardancy of the composition when applied to the copolymer in which the (meth)acrylic acid ester monomer and the polar functional group-containing monomer are polymerized. This is because the thermally conductive inorganic fillers reduce an amount of the copolymer, which can be burnt, and changes thermal conductivity, physical properties, viscosity and the like of the copolymer. In addition, the thermally conductive inorganic fillers undergo endothermic reaction with the copolymer and absorb energy, and thus produce $H_2O$ and $CO_2$ which are nonflammable materials, thereby allowing the composition to exhibit physical flame retardancy.

The thermally conductive inorganic fillers may be present in an amount of about 50 parts by weight to about 300 parts by weight based on 100 parts by weight of the (meth)acrylic acid ester monomer. Within this range, there is no concern of reduction in attachment area due to increase in hardness of the adhesive composition, and the adhesive composition can secure flame retardancy.

The thermally conductive inorganic fillers may have an average particle diameter of about 1 μm to about 200 μm, specifically about 10 μm to about 180 μm. Within this range, there is no problem of increase in viscosity of the adhesive composition before curing, and the adhesive composition can exhibit maximized flame retardancy while suppressing particle sedimentation during curing.

The thermally conductive inorganic fillers may include at least one selected from the group consisting of metal oxide, metal hydroxide, metal nitride, metal carbide, metal boride, and combinations thereof. Specifically, the thermally conductive inorganic fillers may include aluminum oxide, magnesium oxide, zinc oxide, silicon carbide, aluminum nitride, boron nitride, silicon nitride, aluminum hydroxide, magnesium hydroxide, silicon oxide, and the like.

More specifically, when aluminum hydroxide or magnesium hydroxide powder is used as the thermally conductive inorganic fillers, there is an advantage in view of environmental aspects due to extremely low smoke generation when the adhesive composition is burned, and the adhesive composition can secure outstanding flame retardancy. When the adhesive composition is processed at low temperature, aluminum hydroxide is suitable since aluminum hydroxide has a low decomposition temperature of about 200° C., and when the adhesive composition is processed at high temperature, magnesium hydroxide having a relatively high decomposition temperature of about 320° C. may be used. Further, when magnesium hydroxide is used in the form of nano-sized particles, the adhesive composition can secure excellent flame retardancy even though magnesium hydroxide is added in a small amount.

The adhesive composition includes the hollow glass fillers or the bubbles. Here, the amount of each of the (meth) acrylic acid ester monomer and the polar functional group-containing monomer is limited, whereby the adhesive composition can stably include the hollow glass fillers or the bubbles while the hollow glass fillers or the bubbles maintain a certain shape.

Specifically, due to interaction between functional groups of the (meth)acrylic acid ester monomer and the polar functional group-containing monomer, which are present in a certain amount, the hollow glass fillers or the bubbles, which are forcibly added or injected into the adhesive composition according to the present invention or naturally generated therein, can be prevented from floating to the surface of the adhesive composition and then bursting. As such, since stability of the hollow glass fillers or the bubbles is maintained, the adhesive composition can maintain a certain level or higher of density and distribution of the hollow glass fillers or the bubbles regardless of external temperature.

The adhesive composition may include about 10 parts by weight to about 50 parts by weight of the polar functional group-containing monomer based on 100 parts by weight of the (meth)acrylic acid ester monomer. Since the polar functional group-containing monomer is present in this amount, cohesion between the polar functional groups can cause interaction between the functional groups of both monomers and a finally cured adhesive composition can exhibit high cohesion and improved adhesion. Furthermore, the adhesive composition can have improved bubble stability by reducing a phenomenon that the forcibly injected bubbles float to the surface of the adhesive composition and then burst.

When the polar functional group-containing monomer is a carboxyl group-containing monomer, the adhesive composition may include, for example, about 10 parts by weight to about 40 parts by weight of the carboxyl group-containing monomer. In addition, when the polar functional group-containing monomer is a hydroxyl group-containing monomer, the adhesive composition may include, for example, about 25 parts by weight to about 50 parts by weight of the hydroxyl group-containing monomer. Within this range, the adhesive composition can stably include the hollow glass fillers or the bubbles, which have a certain shape.

The hollow glass fillers may include organic hollow glass fillers, inorganic hollow glass fillers, and combinations thereof. Specifically, the hollow glass fillers may include hollow glass bubbles, hollow polymer microspheres, and the like. The glass bubbles refer to lightweight fillers exhibiting high strength and excellent heat resistance and chemical resistance as hollow glass microspheres, which are composed of true glass and have a spherical shape and a low specific gravity. Since the glass bubbles have a much lower specific gravity than fillers used in existing plastics, it can be anticipated that the glass bubbles provide weight reduction due to the specific gravity thereof, reduction in use of resins, improvement in terms of dimensional stability, deformation after molding, processability, moldability, thermal insulation properties, water resistance, and the like.

The hollow polymer microspheres also have a low specific gravity and may be included to reduce the weight of the adhesive composition. For example, commercially available products of the hollow polymer microspheres may include Expancel, Micropearl, and the like.

Therefore, since the adhesive composition according to the present invention includes the hollow glass fillers and thus can have a reduced specific gravity, the adhesive composition can be variously utilized while reducing an overall weight of an adherend to which the adhesive composition is applied.

The bubbles may be formed of a gas. The gas may include various gases, such as nitrogen, carbon dioxide, inert gases including argon, and the like, without being limited thereto. It is important to use a gas that does not inhibit polymerization of the (meth)acrylic acid ester monomer and the polar functional group-containing monomer or mixing of additives therewith, as the gas forming the bubbles. Specifically, nitrogen is suitable among gases forming the bubbles since nitrogen does not inhibit polymerization or mixing and can reduce preparation costs.

Although the hollow glass fillers or the bubbles typically have a spherical shape, the hollow glass fillers or the bubbles may have a distorted spherical shape. The hollow glass fillers are similar to a table tennis ball and can maintain a spherical shape more easily than the bubbles.

Specifically, the hollow glass fillers or the bubbles may have a diameter of about 20 µm to about 300 µm, more specifically from about 50 µm to about 200 µm. Within this range of the diameter of the hollow glass fillers or the bubbles, the adhesive composition can secure light weight and cushioning properties, and stability of the adhesive composition can be confirmed based on the diameter.

In addition, the hollow glass fillers or the bubbles may be present in an independent form of each other or in a continuous form. That is, the adhesive composition may also include the hollow glass fillers or the bubbles in a continuous form, in which there is fusion-bonding between the hollow glass fillers, between the bubbles, or between the hollow glass fillers and the bubbles.

The hollow glass fillers may be present in an amount of about 0.1 parts by weight to about 20 parts by weight, specifically about 3 parts by weight to about 10 parts by weight, based on 100 parts by weight of the (meth)acrylic acid ester monomer. Within this range, the adhesive composition allows easy curing shrinkage and can maintain strength. On the other hand, if the hollow glass fillers are present in an excessively small amount, it is difficult to obtain a desired density of the hollow glass fillers, and if the hollow glass fillers are present in an excessively large amount, the adhesive composition can have excessively increased viscosity and thus is difficult to stir or suffers from deterioration in adhesion.

The hollow glass fillers or the bubbles may be uniformly dispersed in the adhesive composition. As the hollow glass fillers or the bubbles exhibit higher stability, the hollow glass fillers or the bubbles can be more uniformly dispersed in the adhesive composition and be contained in a larger amount in the adhesive composition. On the contrary, when the hollow glass fillers or the bubbles exhibit low stability, since the hollow glass fillers or the bubbles burst and thus exhibit deteriorated dispersibility and distribution, the hollow glass fillers or the bubbles cannot be uniformly dispersed and are contained in a relatively small amount in the adhesive composition.

The adhesive composition may include hollow polymer microspheres in addition to the hollow glass fillers. The hollow polymer microspheres refer to spherical polymeric shells filled with gases which are present at room temperature. Although the hollow polymer microspheres do not burst under typical conditions of preparation processes of the adhesive composition, such as coating, thermal curing or photocuring, and the like, the hollow polymer microspheres can burst due to high gas pressure inside the spheres and shape instability of the spheres when heated under predetermined conditions, for example, at a certain temperature or higher.

The gases inside the hollow polymer microspheres may be any gases so long as the gases are present at room temperature. For example, the hollow polymer microspheres may be filled with nitrogen, carbon dioxide, pentane, butane, and the like. Preferably, the hollow polymer microspheres are filled with pentane, butane or the like, which has a relatively high molecular weight. In addition, polymeric shells of the hollow polymer microspheres may be made of acrylic, vinylidene chloride, or styrene polymers.

Specifically, the hollow glass fillers or the bubbles may be present in an amount of about 0.1 vol % to about 10 vol %. Within this range, the adhesive composition can exhibit flexibility and cushioning properties, thereby providing an increased attachment area. In addition, since the amount of the bubbles is maintained at a constant volume percentage, the bubbles can be uniformly present in the adhesive composition without bursting.

The adhesive composition may have a density of about 0.6 g/cm$^3$ to about 1.5 g/cm$^3$, specifically about 0.8 g/cm$^3$ to about 1.3 g/cm$^3$, more specifically about 0.9 g/cm$^3$ to about 1.1 g/cm$^3$. If the density of the adhesive composition is low, it can be inferred that the hollow glass fillers or the bubbles are uniformly dispersed well. On the other hand, if the density of the adhesive composition is high, it can be inferred that the hollow glass fillers or the bubbles have low dispersibility due to bursting thereof.

Therefore, since the amount of each of the monomers forming the copolymer in the adhesive composition is limited, the hollow glass fillers or the bubbles can be uniformly distributed, and the density of the adhesive composition can be maintained within the above range. In addition, the adhesive composition is coated onto one surface or both surfaces of acrylic foam, whereby the adhesive composition-coated foam can be used as a foam tape.

An adhesive composition coating layer may have a thickness of, for example, about 100 μm to about 3000 μm, specifically about 400 μm to about 2000 μm, without being limited thereto. Within this range, the adhesive composition can secure desired cushioning properties and can exhibit improved adhesion to curved or uneven surfaces.

Method for Preparing Adhesive Composition

In accordance with another aspect of the present invention, a method for preparing an adhesive composition includes: preparing a copolymer by polymerizing about 10 parts by weight to about 50 parts by weight of a polar functional group-containing monomer based on 100 parts by weight of a (meth)acrylic acid ester monomer; preparing a mixture by adding thermally conductive inorganic fillers, a surfactant, a photoinitiator and a photocuring agent to the copolymer; and adding hollow glass fillers to the mixture or injecting bubbles into the mixture.

The method for preparing an adhesive composition includes preparing the copolymer by polymerizing about 10 parts by weight to about 50 parts by weight of the polar functional group-containing monomer based on 100 parts by weight of the (meth)acrylic acid ester monomer. Specifically, the preparation of the copolymer is achieved by thermal polymerization of the (meth)acrylic acid ester monomer and the polar functional group-containing monomer. Here, thermal polymerization may be performed by any method known in the art.

For example, thermal polymerization may be performed at a temperature from about 50° C. to about 70° C., specifically from about 50° C. to about 60° C., for about 1 hour to about 3 hours, specifically for about 2 hours. Here, the (meth)acrylic acid ester monomer and the polar functional group-containing monomer, which are subjected to polymerization, may be added in a lump, separately or continuously added.

The method for preparing an adhesive composition includes preparing the mixture by adding the thermally conductive inorganic fillers, the surfactant, the photoinitiator and the photocuring agent to the copolymer in which the (meth)acrylic acid ester monomer and the polar functional group-containing monomer are polymerized. Here, the thermally conductive inorganic fillers, the surfactant, the photoinitiator and the photocuring agent, which are used, are not particularly limited, and suitable additives may be used depending upon purposes of the adhesive composition.

The amount and kind of thermally conductive inorganic fillers are as described above, and since the adhesive composition includes the thermally conductive inorganic fillers, the adhesive composition can secure flame retardancy.

The surfactant may include ionic surfactants, silicone surfactants, and the like. The surfactant may be present in an amount of about 0.01 parts by weight to about 5 parts by weight, specifically about 0.05 parts by weight to about 3 parts by weight, based on 100 parts by weight of the polymerized resin.

The photoinitiator may include, for example, benzoin, benzoin methyl ether, benzoin benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxyl)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butyl anthraquinone, 2-amino anthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone], 2,4,6-trimethylbenzoyldiphenylphosphine oxide, bis(2,4,6-trimethylbenzoyl)phenylphosphine oxide, α,α-methoxy-α-hydroxyacetophenone, 2-benzoyl-2-(dimethylamino)-1-[4-(4-morphonyl)phenyl]-1-butanone, 2,2-dimethoxy-2-phenylacetophenone, and the like, without being limited thereto.

The photoinitiator may be present in an amount of about 0.01 parts by weight to about 5 parts by weight, specifically about 0.05 parts by weight to about 3 parts by weight, based on 100 parts by weight of the polymerized resin, without being limited thereto.

The photocuring agent can serve to adjust adhesion of the adhesive composition or to impart a crosslinked structure thereto depending upon the amount of the used photoinitiator. For example, the photocuring agent may include polar monomers of polyfunctional acrylates and the like. Specifically, the photocuring agent may include at least one selected from the group consisting of 1,4-butanediol di(meth)acrylate, 1,6-hexanediol di(meth)acrylate, neopentyl glycol di(meth)acrylate, 1,2-ethylene glycol di(meth)acrylate, polyethylene glycol di(meth)acrylate, 1,12-dodecanediol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentanyl di(meth)acrylate, ethylene oxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethylene oxide-modified hexahydrophthalic acid di(meth)acrylate, tricyclodecanedimethanol(meth)acrylate, neopentyl glycol-modified trimethylpropane di(meth)acrylate, adamantane di(meth)acrylate, 9,9-bis[4-(2-acryloyloxyethoxy)phenyl]fluorene, trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(meth)acryloxyethyl isocyanurate, diglycerin tetra(meth)acrylate, pentaerythritol tetra(meth)acrylate, propionic acid-modified dipentaerythritol penta(meth)acrylate, dipentaerythritol hexa(meth)acrylate, caprolactone-modified dipentaerythritol hexa(meth)acrylate, and urethane(meth)acrylate which is a reaction product of an isocyanate monomer and trimethylolpropane tri(meth)acrylate.

The photocuring agent may be present in an amount of about 0.05 parts by weight to about 2 parts by weight, based on 100 parts by weight of the polymerized resin. Within this range, there is no concern of deterioration in durability of the adhesive composition due to deterioration in cohesion, and there is also no concern of deterioration in durability thereof under high temperature and high humidity conditions.

The method for preparing an adhesive composition includes adding the hollow glass fillers to the mixture or injecting the bubbles into the mixture.

When the adhesive composition simultaneously includes the hollow glass fillers and the bubbles, first, the hollow glass fillers may be added to the mixture, followed by stirring, thereby preparing an adhesive mixture. Next, the adhesive mixture may be subjected to vacuum degassing using a vacuum pump, followed by injecting the bubbles into the adhesive mixture, thereby preparing an adhesive composition according to the present invention.

The method for preparing an adhesive composition may further include curing the mixture including the hollow glass filler or the bubbles therein. By curing, the adhesive composition can be coated onto one surface or both surfaces of acrylic foam.

Since the photoinitiator is required to be activated to cure the mixture, it is important to irradiate the mixture including the hollow glass filler or the bubbles therein with active energy rays. The active energy rays may include ionizing radiation, such as $\alpha$-rays, $\beta$-rays, gamma rays, neutron beams, electron beams and the like, ultraviolet rays, and the like. In particular, ultraviolet rays are suitable as the active energy rays. In addition, the photoinitiator may be activated to cause curing of the mixture using any irradiation energy, irradiation time, irradiation method and the like for the active energy rays without limitation.

In addition, to suppress or prevent bursting of the hollow glass fillers or the bubbles, addition of the hollow glass fillers or injection of the bubbles and curing may be successively performed. Specifically, the mixture including the hollow glass filler or the bubbles therein may be coated onto a predetermined surface, followed by drying, curing or the like, as needed, thereby preparing an adhesive composition coating layer.

That is, the hollow glass fillers or the bubbles may be added to or injected into the mixture including the surfactant, the photoinitiator and the photocuring agent, followed by coating the mixture onto a predetermined surface, and then subjected to heating or active energy ray irradiation, thereby preparing the adhesive composition coating layer. Here, the adhesive composition coating layer may include the hollow glass fillers or the bubbles, which are uniformly dispersed.

Hereinafter, the present invention will be described in more detail with reference to some examples. It should be understood that these examples are provided for illustration only and are not to be construed in any way as limiting the present invention.

EXAMPLE 1

14 parts by weight of a polar acrylic acid monomer was added to a 1 liter glass reactor based on 100 parts by weight of 2-ethylhexyl acrylate, followed by thermal polymerization, thereby obtaining a copolymer having a viscosity of 3500 cP. 0.5 parts by weight of Irgacure-651 ($\alpha,\alpha$-methoxy-$\alpha$-hydroxyacetophenone) as a photoinitiator and 0.35 parts by weight of 1,6-hexanediol diacrylate (HDDA) as a crosslinking agent were added to 100 parts by weight of the thermally polymerized copolymer, and 100 parts by weight of aluminum hydroxide powder (H-100, ShowaDenko Co., Ltd.) having an average particle diameter of 70 µm was added as thermally conductive fillers based on 100 parts by weight of 2-ethylhexyl acrylate, followed by sufficient stiffing until the components were uniformly mixed, thereby preparing a mixture.

4.5 parts by weight of glass bubbles and 1.5 parts by weight of silica were added to the prepared mixture, followed by sufficient stirring until the components were uniformly mixed. Next, the mixture was subjected to vacuum degassing using a vacuum pump.

Next, nitrogen gas and 5 parts by weight of a silicone surfactant (based on 100 parts by weight of the thermally polymerized copolymer), which included 80% by weight (wt %) of a siloxane polyalkyleneoxide copolymer and 20 wt % of a non-siloxane polymer, were injected into the vacuum-degassed mixture using a foaming agent (Frother). Next, an adhesive composition was coated to a thickness of 0.8 mm onto a PET film through a UV curing apparatus, thereby manufacturing an acrylic foam tape. Here, a coating temperature was maintained at 10° C.

EXAMPLE 2

An acrylic foam tape was prepared in the same manner as in Example 1 except that the coating temperature was set to 25° C.

EXAMPLE 3

An acrylic foam tape was prepared in the same manner as in Example 2 except that 25 parts by weight of 2-hydroxyethyl acrylate was present based on 100 parts by weight of 2-ethylhexyl acrylate.

COMPARATIVE EXAMPLE 1

An acrylic foam tape was prepared in the same manner as in Example 1 except that 5 parts by weight of the polar acrylic acid monomer was present based on 100 parts by weight of 2-ethylhexyl acrylate.

COMPARATIVE EXAMPLE 2

An acrylic foam tape was prepared in the same manner as in Example 2 except that 5 parts by weight of the polar acrylic acid monomer was present based on 100 parts by weight of 2-ethylhexyl acrylate.

COMPARATIVE EXAMPLE 3

An acrylic foam tape was prepared in the same manner as in Example 2 except that 9 parts by weight of 2-hydroxyethyl acrylate was present based on 100 parts by weight of 2-ethylhexyl acrylate.

EXPERIMENTAL EXAMPLE 1

Bubble Stability Depending Upon Copolymer Composition

To evaluate stability of glass bubbles or bubbles according to different composition ratios of a (meth)acrylic acid ester monomer and a polar functional group-containing monomer, density and the number of bubbles were measured on each of specimens prepared in Examples and Comparative Examples.

1) Density: Density of each of the specimens of Examples and Comparative Examples was measured using an electronic solid gravimeter (DME-220E).

2) Number of bubbles: The number of bubbles was measured on an SEM image of each of the specimens of Examples and Comparative Examples, followed by analyzing the number of bubbles in a certain area (500 µm×1000 µm). Here, objects looking like dents were considered bubbles, and only the number of bubbles was determined.

TABLE 1

| | Temperature (° C.) | Copolymer composition (based on 100 parts by weight of 2-EHA) | Density of adhesive composition (g/m³) | Number of bubbles in adhesive composition | Stability |
|---|---|---|---|---|---|
| Example 1 | 10 | AA 14 parts by weight | 0.99 | 20 | ○ |
| Example 2 | 25 | AA 14 parts by weight | 1.02 | 19 | ○ |
| Example 3 | 25 | 2-HEA 25 parts by weight | 1.01 | 20 | ○ |
| Comparative Example 1 | 10 | AA 5 parts by weight | 1.53 | 7 | X |
| Comparative Example 2 | 25 | AA 5 parts by weight | 1.54 | 6 | X |
| Comparative Example 3 | 25 | 2-HEA 9 parts by weight | 1.56 | 4 | X |

Referring to Table 1, the adhesive compositions of Examples 1 to 3 including the copolymer, in which the (meth)acrylic acid ester monomer and the polar functional group-containing monomer were mixed in a ratio within the range according to the present invention, had a density of about 1.0 g/cm³, regardless of external temperature. Since the adhesive compositions of Examples 1 to 3 had a lower density than those of Comparative Examples 1 to 3, it could be inferred that the bubbles were dispersed well in the adhesive compositions of Examples 1 to 3. In addition, since the adhesive compositions of Examples 1 to 3 had about 20 bubbles per unit area, it could be seen that the adhesive compositions of Examples 1 to 3 exhibited excellent bubble stability.

On the contrary, since the adhesive compositions of Comparative Examples 1 to 3 included the copolymer in which the (meth)acrylic acid ester monomer and the polar functional group-containing monomer were mixed in a different ratio from the ratio according to the present invention, the adhesive compositions of Comparative Examples 1 to 3 had higher density than those of Examples 1 to 3, and had the small number of bubbles, that is, 10 or fewer bubbles. As such, it could be seen that the adhesive compositions of Comparative Examples 1 to 3 exhibited deterioration in dispersibility of the bubbles due to bursting of the bubbles and this result was caused by the monomer composition in the copolymer of the adhesive composition.

EXPERIMENTAL EXAMPLE 2

Flame Retardancy of Flame Retardant Adhesive Composition

Five specimens having a size of 5"×½"×thickness were prepared from each of the acrylic foam tapes prepared in Examples 1 to 3. Each of the specimens was brought into contact with a single blue methane gas flame for 10 seconds, followed by removal of the flame. Next, if a fire of the specimen self-extinguished, the specimen was brought into contact with the flame for 10 seconds again, followed by removal of the flame again, thereby performing a flame retardancy test. The aforementioned method is Underwriters Laboratories (UL)-94 vertical flammability testing. According to this method, the specimens were rated based on burning time, flame fall and afterglow extinguishing time, and ratings of the specimens are as listed in Table 2.

TABLE 2

| | Sum of first and second burning times and afterglow extinguishing times of each specimen | Total sum of first and second burning times of five specimens | Flammability of cotton due to flame fall |
|---|---|---|---|
| V-0 | Within 10 seconds | Within 50 seconds | Not to be flammable |
| V-1 | Within 30 seconds | Within 250 seconds | Not to be flammable |
| V-2 | Within 30 seconds | Within 250 seconds | Not to be flammable |

The acrylic foam tapes of Examples 1 to 3 included the adhesive composition in which aluminum hydroxide powder was used as the thermally conductive fillers. Here, when each of the specimens of Examples 1 to 3 catches fire by heat due to the thermally conductive fillers, aluminum hydroxide was oxidized and decomposed into alumina, whereby the specimen exhibits self flammability. Therefore, the specimens of Examples 1 to 3 generated an extremely small amount of smoke and thus had an advantage in view of environmental aspects. In addition, it could be seen that the specimens of Examples 1 to 3 obtained certification of V2 and thus secured excellent flame retardancy.

Therefore, it was confirmed that the flame retardant adhesive composition according to the present invention included the thermally conductive fillers unlike general adhesive compositions and thus secured flame retardancy.

The invention claimed is:

1. An adhesive tape comprising:
an adhesive composition, comprising:
a copolymer in which 14 parts by weight to 25 parts by weight of a polar functional group-containing monomer is polymerized based on 100 parts by weight of a (meth)acrylic acid ester monomer;
thermally conductive inorganic fillers;
hollow glass fillers and bubbles; and
a surfactant including 80% by weight of a siloxane polyalkyleneoxide copolymer and 20% by weight of a non- siloxane polymer,
wherein:
the hollow glass fillers and the bubbles are uniformly dispersed in the adhesive composition,
the thermally conductive inorganic fillers are present in an amount of 50 parts by weight to 300 parts by weight based on 100 parts by weight of the (meth)acrylic acid ester monomer, the hollow glass fillers are present in an amount of 6 parts by weight to 10 parts by weight based on 100 parts by weight of the (meth)acrylic acid ester monomer, the surfactant is present in an amount of 5 parts by weight based on 100 parts by weight of the copolymer, the bubbles are present in an amount of 0.1 vol % to 10 vol % per unit, the (meth)acrylic acid ester monomer is a $C_1$ to $C_{14}$ alkyl group-containing (meth)acrylic acid ester monomer, and the copolymer is achieved by thermal polymerization of the (meth)acrylic acid ester monomer and the polar functional group-containing monomer, and wherein the adhesive tape is manufactured by UV curing of the adhesive composition by coating a thickness of 0.8 mm onto a PET film at a coating temperature of 10° C., and the adhesive tape has 19 to 20 bubbles in an area of 500 μm ×1000 μm of the adhesive tape.

2. The adhesive tape according to claim 1, wherein the acrylic acid ester monomer comprises at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, and combinations thereof.

3. The adhesive tape according to claim 1, wherein the polar functional group-containing monomer comprises at least one selected from the group consisting of hydroxyl group-containing monomers, carboxyl group-containing monomers, nitrogen-containing monomers, and combinations thereof.

4. The adhesive tape according to claim 1, wherein the thermally conductive inorganic fillers have an average particle diameter from 1 μm to 200 μm.

5. The adhesive tape according to claim 1, wherein the thermally conductive inorganic fillers comprise at least one selected from the group consisting of metal oxide, metal hydroxide, metal nitride, metal carbide, metal boride, and combinations thereof.

6. The adhesive tape according to claim 1, wherein the hollow glass fillers or the bubbles have a spherical shape.

7. The adhesive tape according to claim 1, wherein the hollow glass fillers or the bubbles have a diameter of 20 μm to 300 μm.

8. A method for preparing an adhesive tape of claim 1, comprising:

preparing a copolymer by polymerizing 14 parts by weight to 25 parts by weight of a polar functional group-containing monomer based on 100 parts by weight of a (meth)acrylic acid ester monomer;

preparing a mixture by adding thermally conductive inorganic fillers, a surfactant, a photoinitiator and a photocuring agent to the copolymer; and adding hollow glass fillers to the mixture and injecting bubbles into the mixture, wherein the surfactant includes 80% by weight of a siloxane polyalkyleneoxide copolymer and 20% by weight of a non- siloxane polymer, the surfactant is present in an amount of 5 parts by weight based on 100 parts by weight of the copolymer, the thermally conductive inorganic fillers are present in an amount of 50 parts by weight to 300 parts by weight based on 100 parts by weight of the (meth)acrylic acid ester monomer, the hollow glass fillers and the bubbles are uniformly dispersed in the adhesive composition, the hollow glass fillers are present in an amount of 6 parts by weight to 10 parts by weight based on 100 parts by weight of the (meth)acrylic acid ester monomer, or the bubbles are present in an amount of 0.1 vol % to 10 vol % per unit, the adhesive composition has a density of 0.6 g/cm$^3$ to 1.5 g/cm$^3$, the (meth)acrylic acid ester monomer is a $C_1$ to $C_{14}$ alkyl group-containing (meth)acrylic acid ester monomer, and the copolymer is achieved by thermal polymerization of the (meth)acrylic acid ester monomer and the polar functional group-containing monomer, and curing the mixture comprising the hollow glass fillers and the bubbles therein.

* * * * *